United States Patent
Ohata

(10) Patent No.: US 11,215,247 B2
(45) Date of Patent: Jan. 4, 2022

(54) VEHICLE AUTOMATIC TRANSMISSION DEVICE, AND VEHICLE INCLUDING THE SAME

(71) Applicant: YAMAHA HATSUDOKI KABUSHIKI KAISHA, Iwata (JP)

(72) Inventor: Shinobu Ohata, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/070,983

(22) Filed: Oct. 15, 2020

(65) Prior Publication Data

US 2021/0114582 A1 Apr. 22, 2021

(30) Foreign Application Priority Data

Oct. 17, 2019 (JP) .............................. JP2019-190344

(51) Int. Cl.
*F16D 48/06* (2006.01)
*B60W 10/11* (2012.01)
(Continued)

(52) U.S. Cl.
CPC ........... *F16D 48/068* (2013.01); *B60W 10/02* (2013.01); *B60W 10/11* (2013.01); *F16D 48/06* (2013.01); *F16H 61/12* (2013.01); *B60W 2510/1005* (2013.01); *B60W 2510/1025* (2013.01); *F16D 2300/22* (2013.01); *F16D 2500/1083* (2013.01); *F16D 2500/1085* (2013.01); *F16D 2500/10412* (2013.01); *F16D 2500/30406* (2013.01); *F16D 2500/30421* (2013.01); *F16D 2500/30814* (2013.01); *F16D 2500/3166* (2013.01); *F16D 2500/7041* (2013.01);
(Continued)

(58) Field of Classification Search
None
See application file for complete search history.

(56) References Cited

U.S. PATENT DOCUMENTS 5,421,440 A * 6/1995 Kumagai .............. F16D 48/064
192/103 R
2005/0222736 A1* 10/2005 Lee ........................ F16H 61/061
701/67
(Continued)

FOREIGN PATENT DOCUMENTS

| JP | 2004-270812 A | 9/2004 |
|----|----|----|
| JP | 2013-122262 A | 6/2013 |
| JP | 2016-114190 A | 6/2016 |

*Primary Examiner* — Timothy Hannon
(74) *Attorney, Agent, or Firm* — Keating and Bennett, LLP

(57) ABSTRACT

An automatic transmission device for a vehicle driven by transmitting a torque of an engine to driving wheels includes a clutch provided in a torque transmission system extending from the engine to the driving wheels, a transmission located between the clutch and the driving wheels in the torque transmission system, and a transmission controller. The transmission controller is configured or programmed to perform a torque feedback-control to bring the clutch into a sliding state in response to issue of a shift command and feedback-control a transmission torque to a target torque, disengage the clutch after the torque feedback-control, change a shift stage of the transmission according to the shift command after disengaging the clutch, and engage the clutch after changing the shift stage.

8 Claims, 8 Drawing Sheets

(51) Int. Cl.
*F16H 61/12* (2010.01)
*B60W 10/02* (2006.01)
*F16H 61/00* (2006.01)
*F16H 61/04* (2006.01)

(52) U.S. Cl.
CPC ............... *F16D 2500/7061* (2013.01); *F16D 2500/70426* (2013.01); *F16H 2061/0078* (2013.01); *F16H 2061/0462* (2013.01)

(56) References Cited

U.S. PATENT DOCUMENTS

| | | | |
|---|---|---|---|
| 2010/0010718 A1* | 1/2010 | Tona | F16D 48/06 |
| | | | 701/68 |
| 2015/0276050 A1* | 10/2015 | Fodor | F16H 61/0437 |
| | | | 701/60 |
| 2016/0061319 A1* | 3/2016 | Fodor | B60W 30/18027 |
| | | | 701/60 |
| 2016/0167655 A1 | 6/2016 | Minami | |
| 2019/0128345 A1* | 5/2019 | Udd | B60W 10/02 |

* cited by examiner

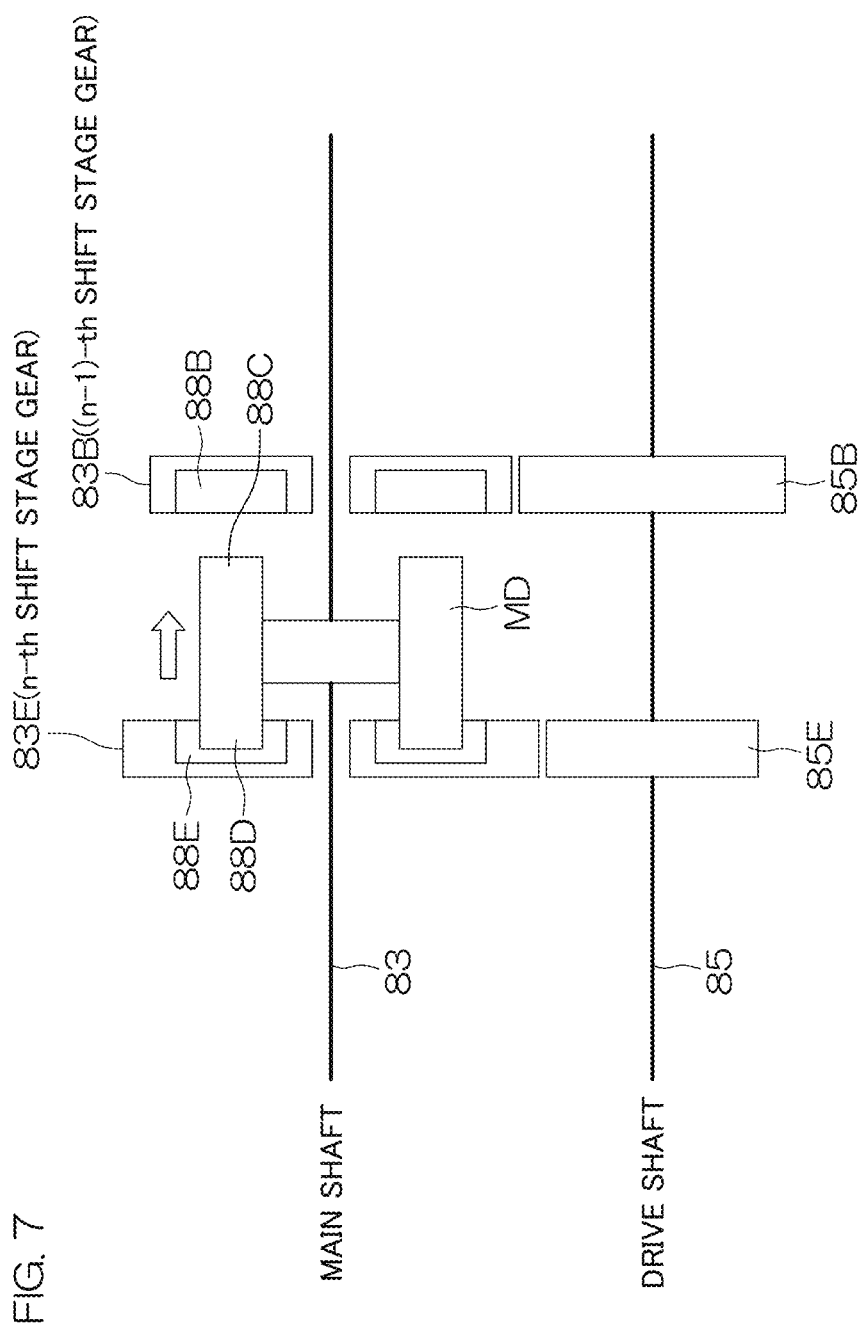

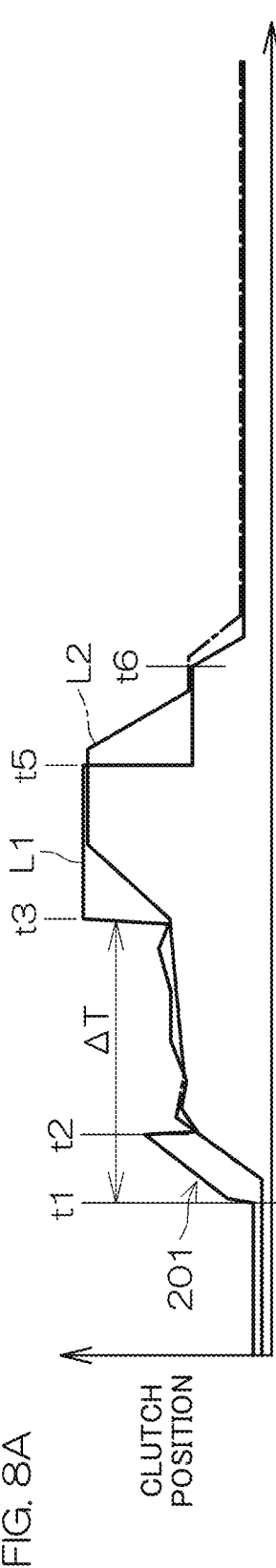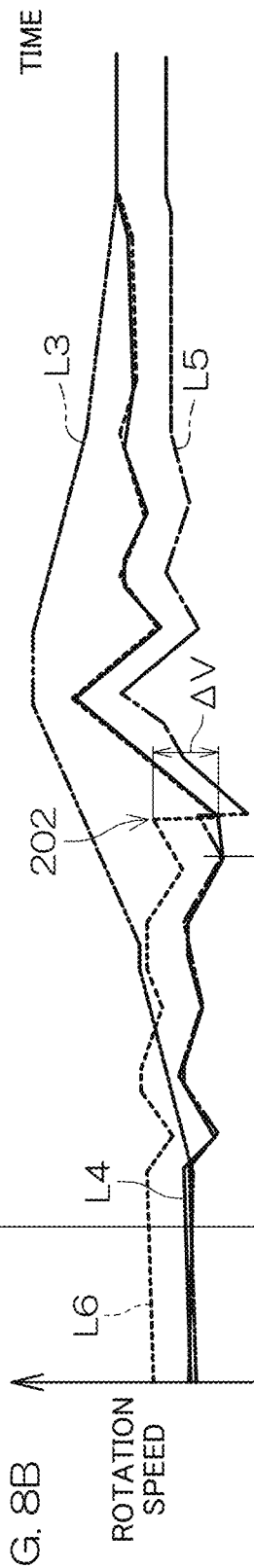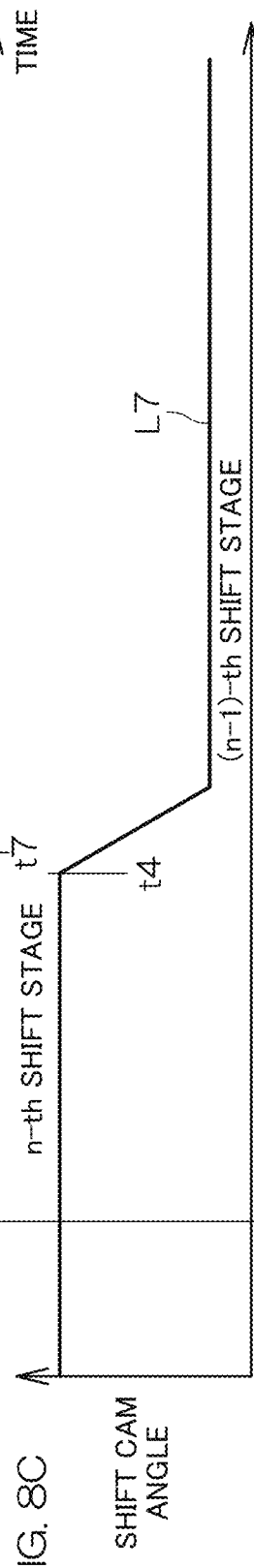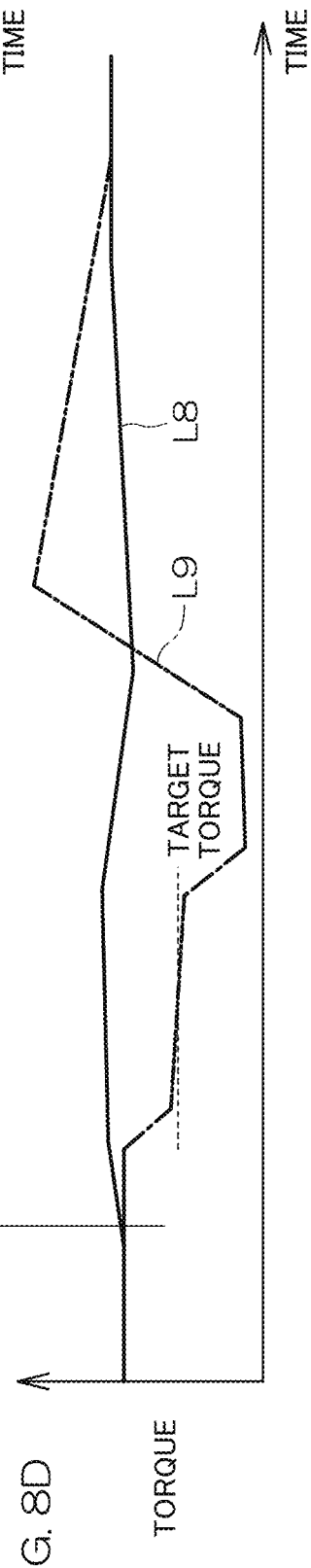

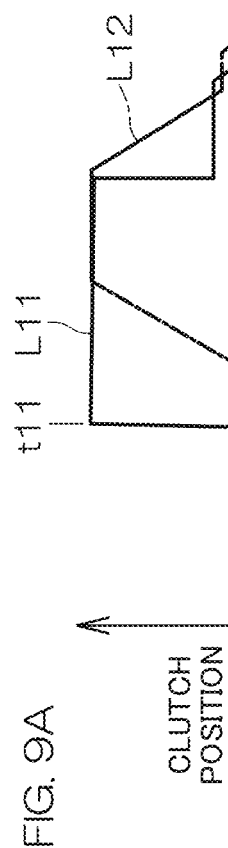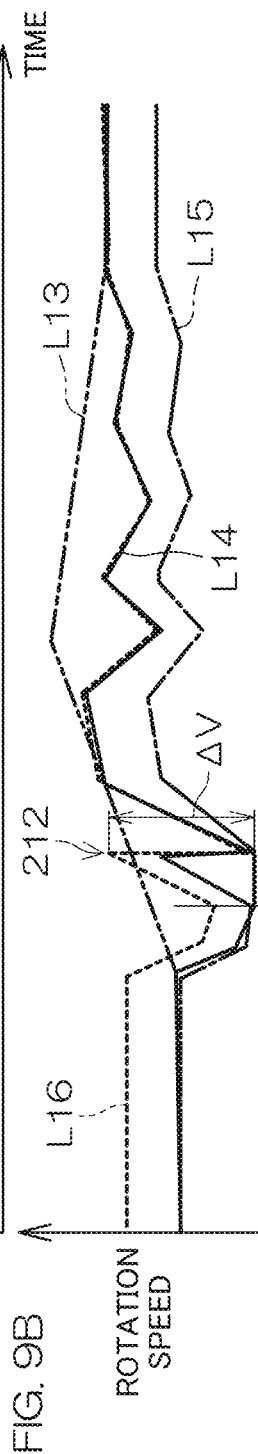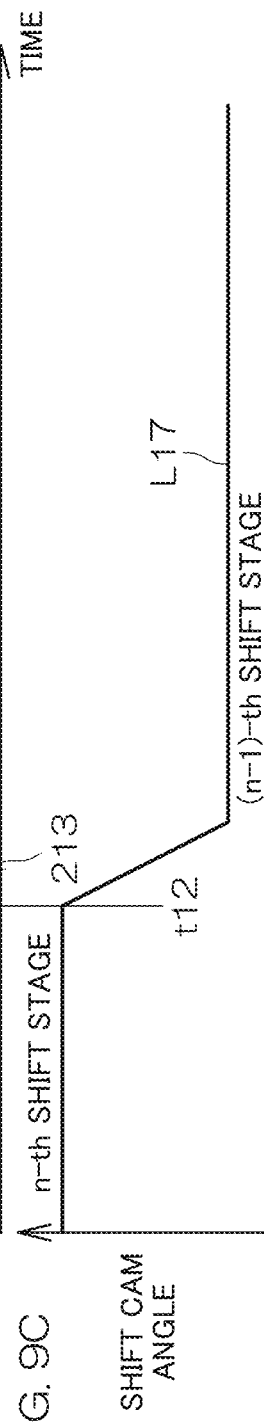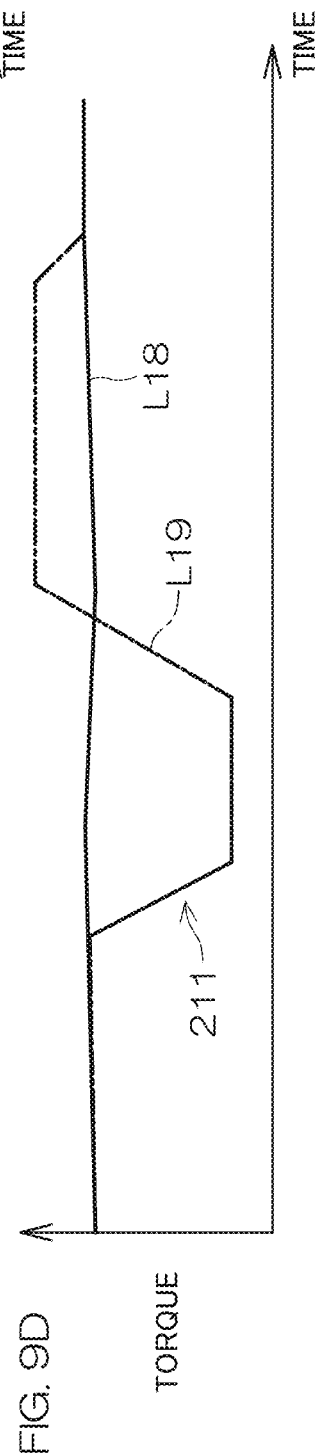

VEHICLE AUTOMATIC TRANSMISSION DEVICE, AND VEHICLE INCLUDING THE SAME

CROSS REFERENCE TO RELATED APPLICATIONS

This application claims the benefit of priority to Japanese Patent Application No. 2019-190344 filed on Oct. 17, 2019. The entire contents of this application are hereby incorporated herein by reference.

BACKGROUND OF THE INVENTION

1. Field of the Invention

The present invention relates to a vehicle automatic transmission device, and a vehicle including the vehicle automatic transmission device.

2. Description of the Related Art

JP 2013-122262 A1 discloses a clutch control device for an automatic transmission. When a clutch is disengaged prior to a shift operation of the transmission, the clutch control device performs a control operation to reduce a shift time while eliminating a shock (clutch disengagement shock) occurring due to the clutch disengagement. Specifically, when the clutch is operated in a disengaging direction, the clutch control device monitors the sliding state of the clutch, and detects transition to a half-engagement state. Upon the detection of the half-engagement state, the clutch control device increases the operation rate of the clutch to hasten the completion of the clutch disengagement. Immediately thereafter, the shift stage of the transmission is shifted from a current shift stage to a target shift stage.

SUMMARY OF THE INVENTION

The inventor of preferred embodiments of the present invention described and claimed in the present application conducted an extensive study and research regarding a vehicle automatic transmission device, such as the one described above, and in doing so, discovered and first recognized new unique challenges and previously unrecognized possibilities for improvements as described in greater detail below.

The clutch disengagement shock occurs when a torsional torque applied to a drive system is instantly released with the clutch kept in an engagement state. In JP 2013-122262 A1, therefore, the clutch is gradually disengaged to prevent the torsional torque from being instantly released. On the other hand, the completion of the clutch disengagement is hastened on the assumption that a great shock does not occur even if the clutch is operated at an increased operation rate in the disengaging direction after the clutch is brought into the half-engagement state.

However, the torsional torque is fluctuated to be converged, because a torsion element in a torque transmission path downstream of the clutch is elastically restored from the torsion. If the clutch is brought into a disengagement state before the fluctuation of the torsional torque is converged, the torsion of the torsion element is vibrationally fluctuated, and the rotation speed of the rotation shaft of the transmission is correspondingly vibrationally fluctuated. When the shift stage is shifted to the target shift stage, a greater load is liable to be applied to constituent components of the transmission due to the vibrational rotation speed fluctuation. In addition, a gear shift feeling is liable to deteriorate.

For example, the transmission may have a configuration that achieves the shift operation by engaging a dog splined to an internal rotation shaft with a dog fixed to a transmission gear rotatably provided around the rotation shaft. In this case, if a relative speed (relative dog speed) of the pair of dogs to be engaged with each other for the shifting to the target shift stage is vibrationally fluctuated, a higher relative dog speed occurs at a certain timing. This may apply a greater load to the dogs, and deteriorate the gear shift feeling.

Particularly, in a vehicle, such as an irregular ground traveling vehicle, required to be light-weight and generate a high torque, a torque transmission system downstream of a clutch tends to be less rigid in order to meet the requirement for the light weight, while a drive source is adapted to generate a higher torque. In addition, a clutch damper is often provided downstream of the clutch in order to reduce a shock occurring when the torque is transmitted. This makes it impossible to eliminate a torsion element downstream of the clutch, and is liable to increase the amplitude of the elastic vibration of the torsion element. Accordingly, the rotation speed fluctuation is not easily converged in the clutch disengagement, and significantly influences the shift operation.

These problems, which have been discovered by the inventor of preferred embodiments of the present invention, are not pointed out in JP 2013-122262 A1, and cannot be solved by the arrangement disclosed in JP 2013-122262 A1.

In order to overcome the previously unrecognized and unsolved challenges described above, preferred embodiments of the present invention provide vehicle automatic transmission devices that each provide a stable shift operation by reducing the vibrational rotation fluctuation in the shift operation, and vehicles including the automatic transmission devices.

According to a preferred embodiment of the present invention, an automatic transmission device for a vehicle that is driven by transmitting a torque of an engine to driving wheels includes a clutch provided in a torque transmission system that extends from the engine to the driving wheels, a transmission located between the clutch and the driving wheels in the torque transmission system, and a transmission controller. The transmission controller is configured or programmed to perform a torque feedback-control to bring the clutch into a sliding state in response to issue of a shift command and feedback-control a transmission torque to a target torque, disengage the clutch after the torque feedback-control, change a shift stage of the transmission according to the shift command after disengaging the clutch, and engage the clutch after changing the shift stage.

With this arrangement, if the shift command is issued, the clutch is brought into the sliding state, and the transmission torque of the clutch is feedback-controlled to the target torque. Thus, before the clutch is thereafter disengaged and the shift stage of the transmission is changed, the vibrational rotation fluctuation attributable to the elastic torsion element of the torque transmission system is sufficiently reduced. Therefore, when the shift stage of the transmission is changed, it is possible to prevent the application of a greater load to the constituent components of the transmission and to prevent the deterioration of the gear shift feeling. After the shift stage is changed, the clutch is engaged to complete a series of shift operations.

The torque feedback-control provides a highly robust control operation, thus making it possible to reliably and effectively reduce the vibrational rotation fluctuation attributable to the torsion element of the torque transmission system. In addition, a driving force loss feeling is reduced during the torque feedback-control by properly setting the target torque.

In a preferred embodiment of the present invention, the transmission controller is configured or programmed to induce sliding in the clutch to gradually reduce the engagement strength of the clutch at a predetermined clutch disengagement rate in response to the issue of the shift command until the sliding state of the clutch is detected and, upon the detection of the sliding state of the clutch, start the torque feedback-control.

With this arrangement, if the shift command is issued, a control operation to induce the sliding state of the clutch is performed. Thus, the clutch is able to be quickly brought into the sliding state, so that the torque feedback-control utilizing the sliding state is quickly started. In addition, the sliding state is induced by gradually reducing the engagement strength of the clutch at the predetermined clutch disengagement rate. Thus, the clutch is reliably brought into the sliding state, so that the torsion of the elastic torsion element of the torque transmission system is prevented from being instantly released. This further improves the gear shift feeling.

In a preferred embodiment of the present invention, the transmission controller is configured or programmed to perform the step of setting the clutch disengagement rate based on a transmission torque observed immediately before a start of inducing sliding.

With this arrangement, the clutch disengagement rate is set based on the transmission torque observed immediately before the start of the inducing sliding, so that the clutch is reliably and quickly brought into the sliding state. This makes it possible to quickly start the shift operation, while reducing the vibrational rotation fluctuation attributable to the elastic torsion element of the torque transmission system.

The expression "immediately before the start of inducing sliding" means any time before inducing sliding is started after the shift command has been issued.

In a preferred embodiment of the present invention, the transmission controller is configured or programmed to disengage the clutch after a lapse of a predetermined period of time from the issue of the shift command. With this arrangement, the disengagement of the clutch is performed after a lapse of the predetermined period from the issue of the shift command. Therefore, a sufficient period of time is provided to reduce the torsional vibration of the elastic torsion element by the torque feedback control, and the torque feedback-control is not excessively prolonged. This makes it possible to quickly perform the shift operation, while reducing the application of the load to the constituent components of the transmission and preventing the deterioration of the gear shift feeling.

In a preferred embodiment of the present invention, the shift command includes a downshift command.

The downshift command may be issued in order to provide a higher torque during the traveling of the vehicle. For example, the downshift may be required when the engine rotation speed is relatively high in rapid acceleration or uphill traveling. In this case, the transmission torque of the clutch is high and, if the clutch is suddenly disengaged, the torsion of the elastic torsion element of the torque transmission system is instantly released. Accordingly, the internal rotation shaft of the transmission is liable to suffer from great-amplitude rotation fluctuation. Therefore, a greater load is liable to be applied to the constituent components of the transmission, and a greater shock is liable to occur in the shift operation to deteriorate the gear shift feeling.

The rotation fluctuation of the rotation shaft is reduced by bringing the clutch into the sliding state and feedback-controlling the transmission torque to the target torque when the downshift command is issued. This reduces the load applied to the constituent components of the transmission in the downshift operation, and improves the gear shift feeling.

In a preferred embodiment of the present invention, the torque transmission system includes an elastic torsion element located between the transmission and the driving wheels. With this arrangement, the vibrational rotation fluctuation attributable to the elastic torsion element located between the transmission and the driving wheels is reduced. This makes it possible to reduce the load applied to the constituent components of the transmission and to improve the gear shift feeling.

In a preferred embodiment of the present invention, the elastic torsion element includes a clutch damper. With this arrangement, the shock occurring in the clutch engagement is reduced by the clutch damper. On the other hand, the clutch damper is an elastic torsion element, and is susceptible to great-amplitude torsional vibration. The vibrational rotation fluctuation attributable to the elastic torsion element including the clutch damper is reduced by bringing the clutch into the sliding state and feedback-controlling the transmission torque to the target torque when the shift command is issued. This reduces the shock occurring in the clutch engagement, and prevents the application of a greater load to the transmission components and the deterioration of the gear shift feeling in the shift operation.

According to a preferred embodiment of the present invention, a vehicle includes an engine, driving wheels, and the vehicle automatic transmission device including the above-described features.

With this arrangement, the vehicle is able to prevent the application of a greater load to the constituent components of the transmission, and the deterioration of the gear shift feeling when the shift stage of the transmission is changed.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a schematic diagram for describing a shift operation to be performed in the transmission by way of specific example.

FIGS. 8A to 8D are time charts for describing the shift operation according to a preferred embodiment of the present invention by way of specific example.

FIGS. 9A to 9D are time charts for describing an exemplary shift operation according to a comparative example.

DETAILED DESCRIPTION OF THE PREFERRED EMBODIMENTS

Preferred embodiments of the present invention are applicable to vehicles of any type and any utility without particular limitation. A vehicle category in which preferred embodiments of the present invention are particularly useful is a utility vehicle. In particular, preferred embodiments of the present invention are useful for an off-road four-wheel vehicle referred to as a Recreational Off-Highway Vehicle. The utility vehicle is an exemplary irregular ground traveling vehicle which is used for traveling on irregular ground.

Figure 1:
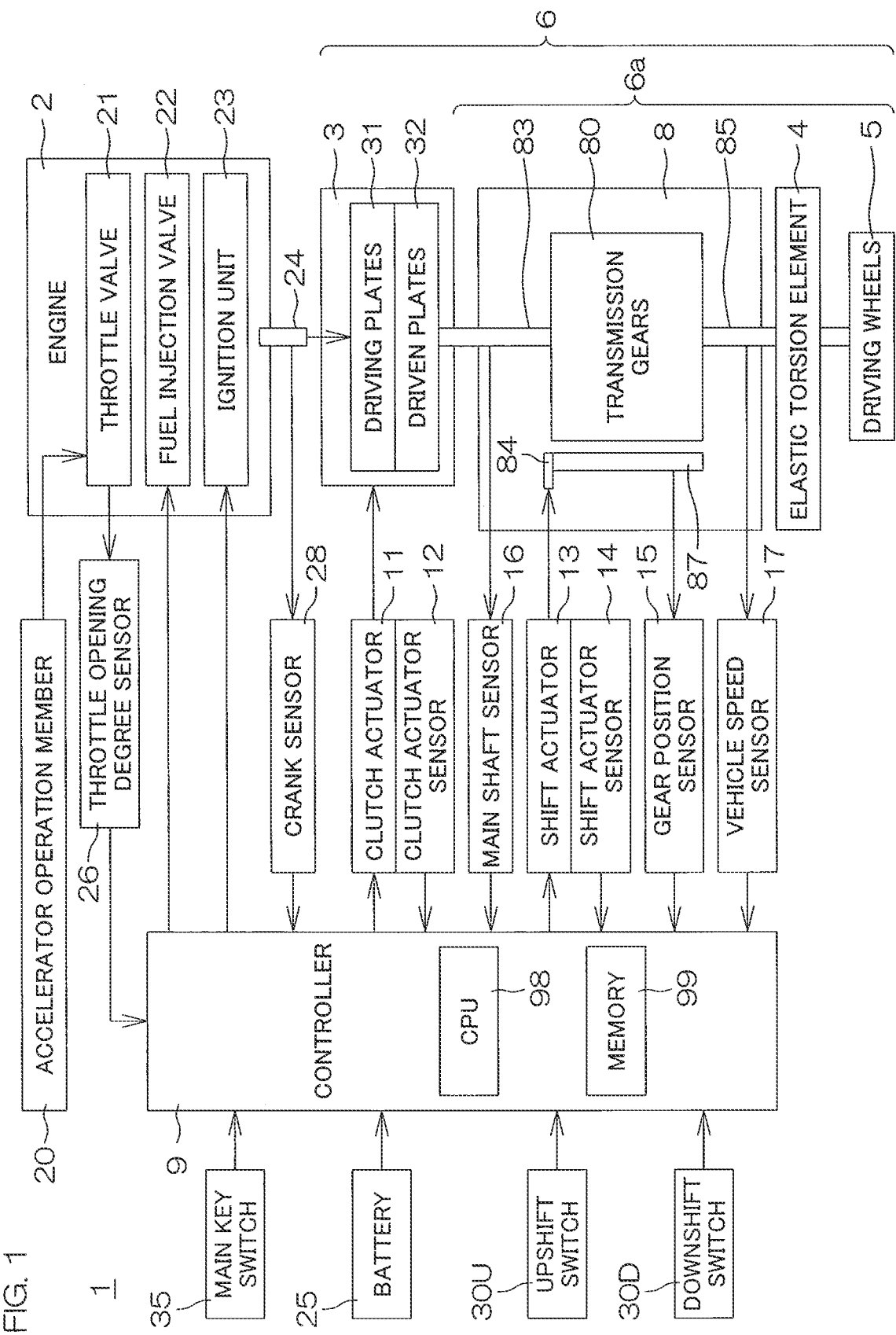
FIG. 1 is a block diagram showing the major construction of a vehicle including a vehicle control device according to a preferred embodiment of the present invention.

FIG. 1 is a block diagram showing the major construction of a vehicle 1 including a vehicle automatic transmission device according to a preferred embodiment of the present invention. The vehicle 1 includes an engine (internal combustion engine) 2, a clutch 3, a transmission 8, and driving wheels 5. A driving force generated by the engine 2 is transmitted to the driving wheels 5 through a torque transmission system 6. The clutch 3 and the transmission 8 are provided in the torque transmission system 6. In the present preferred embodiment, the clutch 3 is located between the engine 2 and the transmission 8.

A torque generated by the engine 2 is transmitted by the clutch 3, and further transmitted to the driving wheels 5 through the transmission 8. An elastic torsion element 4 is located between the transmission 8 and the driving wheels 5 in a torque transmission system 6a downstream of the clutch 3. In the present preferred embodiment, the elastic torsion element 4 includes elastic torsion components of all rigid bodies (elastic members) involved in the torque transmission in the torque transmission system 6a.

The engine 2 includes a throttle valve 21, a fuel injection valve 22, and an ignition unit 23. An accelerator operation member 20 to be operated by a driver is connected to the throttle valve 21. Therefore, the operation amount (accelerator opening degree) of the accelerator operation member 20 and the throttle opening degree have a certain correlation. The accelerator operation member 20 may be an accelerator pedal. The fuel injection valve 22 injects fuel into the engine 2, and the injection amount of the fuel is determined according to the accelerator opening degree and the like. The ignition unit 23 causes spark discharge in the engine 2 at a predetermined ignition timing of an engine cycle, such that a fuel-air mixture is ignited.

The clutch 3 includes driving plates 31 and driven plates 32, and moves the driving plates 31 and the driven plates 32 toward and away from each other. The torque generated by the engine 2 (engine torque) is inputted to the driving plates 31. More specifically, the rotation of a crank shaft 24 of the engine 2 is transmitted to the driving plates 31. A reduction gear may be provided between the crank shaft 24 and the driving plates 31. The driven plates 32 are connected to a main shaft 83 of the transmission 8.

The transmission 8 includes the main shaft 83, a drive shaft 85, a plurality of transmission gears 80, a shifter 84, and a shift cam 87. The transmission gears 80 are able to be located at a plurality gear positions. The plurality of gear positions include at least one forward drive gear position, and at least one reverse drive gear position. The rotation of the main shaft 83 is converted to rotation having a speed ratio and a direction corresponding to a gear position, and transmitted to the drive shaft 85. The drive shaft 85 is mechanically connected to the driving wheels 5. The shifter 84 is an operation member to operate the shift cam 87. The shift cam 87 is shifted (e.g., rotationally shifted), such that the transmission gears 80 are variably shifted. Thus, the gear position is able to be selected.

The vehicle 1 further includes a clutch actuator 11, a shift actuator 13, and a controller 9. The controller 9 is an exemplary vehicle control device which controls various sections of the vehicle 1. In the present preferred embodiment, the controller 9 is an example of the transmission controller. The controller 9 is configured or programmed to control the clutch actuator 11 and the shift actuator 13. The actuators 11, 13 may each be an electric actuator, or may each be a hydraulic actuator.

The clutch actuator 11 moves the driving plates 31 and the driven plates 32 of the clutch 3 toward and away from each other. Further, the clutch actuator 11 increases and reduces a pressing force applied between the driving plates 31 and the driven plates 32 with the driving plates 31 and the driven plates 32 in contact with each other. Thus, the driving plates 31 and the driven plates 32 are kept in frictional contact with each other, and the torque transmitted between the driving plates 31 and the driven plates 32 (transmission torque) is increased or reduced.

Where the driving plates 31 and the driven plates 32 of the clutch 3 are moved toward each other or the pressing force applied between the driving plates 31 and the driven plates 32 is increased, this operation is meant by an expression that the clutch 3 is operated in an engaging direction. Where the driving plates 31 and the driven plates 32 of the clutch 3 are moved away from each other or the pressing force applied between the driving plates 31 and the driven plates 32 is reduced, this operation is meant by an expression that the clutch 3 is operated in a disengaging direction.

The clutch 3 is able to assume a disengagement state, an engagement state, and a half-engagement state. In the disengagement state, the driving plates 31 and the driven plates 32 are spaced from each other, and the torque is not transmitted between the driving plates 31 and the driven plates 32. In the engagement state, the driving plates 31 and the driven plates 32 are connected to each other without sliding, and the torque is transmitted between the driving plates 31 and the driven plates 32. The half-engagement state is a state intermediate between the engagement state and the disengagement state. In the half-engagement state, the driving plates 31 and the driven plates 32 are kept in sliding contact with each other, and the torque is partly transmitted between the driving plates 31 and the driven plates 32. The clutch actuator 11 is controlled so that the state of the clutch 3 is changed among the disengagement state, the half-engagement state, and the engagement state, and the pressing force applied between the driving plates 31 and the driven plates 32 is changed in the half-engagement state.

A clutch actuator sensor 12 detects the position of an operation member of the clutch actuator 11. The position of the operation member of the clutch actuator 11 corresponds to distances between the driving plates 31 and the driven plates 32 of the clutch. With the driving plates 31 and the driven plates 32 in contact with each other, the distances correspond to the pressing force applied between the driving plates 31 and the driven plates 32.

In the following description, the distances between the driving plates 31 and the driven plates 32 are handled as a clutch position.

Specifically, the clutch position corresponds to the displacement amount of the operation member of the clutch actuator 11. The controller 9 drives the clutch actuator 11 based on an output signal of the clutch actuator sensor 12 to control the clutch position. More specifically, the controller 9 generates a clutch command value to command the clutch position, and controls the clutch actuator 11 based on the clutch command value. The output signal of the clutch actuator sensor 12 represents an actual clutch position.

The shift actuator 13 actuates the shifter 84 to operate the shift cam 87, such that a shift operation is performed to change the gear position. A shift actuator sensor 14 detects the position of an operation member of the shift actuator 13. The position of the operation member of the shift actuator 13 corresponds to the position of the shifter 84. The controller 9 controls the shift actuator 13 based on an output signal of the shift actuator sensor 14.

The transmission 8 is provided with a gear position sensor 15 to detect the gear position, and a main shaft sensor 16 to detect the rotation speed of the main shaft 83. Output signals of these sensors are inputted to the controller 9. The gear position sensor 15 detects the gear position of the transmission 8. Specifically, the gear position sensor 15 may be a sensor which detects the position (e.g., rotational position) of the shift cam 87.

A main key switch 35, a battery 25, a throttle opening degree sensor 26, a crank sensor 28, an upshift switch 30U, a downshift switch 30D, and the like are connected to the controller 9.

The main key switch 35 is operated for electrical connection and disconnection to turn on and off the vehicle 1 with the use of a main key. The battery 25 supplies electric power to the controller 9 and other electrical components. The controller 9 monitors the voltage of the battery 25.

The throttle opening degree sensor 26 detects the throttle opening degree of the engine 2. Since the accelerator operation member 20 is connected to the throttle valve 21 of the engine 2, there is a certain correlation between the operation amount (accelerator opening degree) of the accelerator operation member 20 and the throttle opening degree. Therefore, the throttle opening degree sensor 26 also functions as an accelerator opening degree sensor that detects the operation amount of the accelerator operation member 20.

The crank sensor 28 detects the rotation of the crank shaft 24 of the engine 2. The crank sensor 28 generates a rotation pulse, for example, according to a rotation amount during the rotation of the crank shaft 24. The controller 9 determines an engine rotation speed based on the rotation pulse generated by the crank sensor 28. The engine rotation speed has a value corresponding to the rotation speed of the driving plates 31 of the clutch 3.

The upshift switch 30U is operated by the driver in order to change the gear position (shift stage) of the transmission 8 to a higher speed by one stage. The downshift switch 30D is operated by the driver in order to change the gear position (shift stage) of the transmission 8 to a lower speed by one stage. Output signals of these shift switches 30U, 30D are inputted to the controller 9. The controller 9 drives the clutch actuator 11 and the shift actuator 13 according to the inputs from the shift switches 30U, 30D to perform the shift operation to change the gear position (shift stage) among the forward drive gear positions.

To start the vehicle 1, the driver operates the shift switches 30U, 30D to select any of the gear positions other than a neutral position. Thus, the controller 9 drives the shift actuator 13 to change the position of the transmission gear 80 of the transmission 8 to the selected gear position. The driver further operates the accelerator operation member 20 to increase the accelerator opening degree. As the throttle opening degree is correspondingly increased, the engine rotation speed is increased. According to the increase in the engine rotation speed, the controller 9 controls the clutch actuator 11 to reduce the clutch command value, such that the driving plates 31 and the driven plates 32 are moved toward each other.

The controller 9 sets a target engine rotation speed according to the throttle opening degree, and controls the clutch position so as to increase the engine rotation speed to the target engine rotation speed. Thus, the pressing force applied between the driving plates 31 and the driven plates 32 is gradually increased, such that the clutch 3 is brought into the engagement state from the disengagement state through the half-engagement state.

Thus, the torque generated by the engine 2 is transmitted to the transmission 8 via the clutch 3. Further, the rotation speed changed by the transmission 8 is transmitted to the driving wheels 5, such that the vehicle 1 moves. After the clutch 3 reaches the engagement state, the controller 9 controls the fuel injection valve 22 (for a fuel injection control operation) and controls the ignition unit 23 (for an ignition control operation) so as to provide an engine output according to the throttle opening degree.

When the driver operates the upshift switch 30U or the downshift switch 30D during the traveling, a shift command is inputted to the controller 9. In response to the shift command, the controller 9 performs the shift operation. Specifically, the controller 9 controls the clutch actuator 11 to disengage the clutch 3. Further, the controller 9 controls the shift actuator 13 to change the position of the transmission gear 80 to the selected gear position corresponding to the shift command. Thereafter, the controller 9 controls the clutch actuator 11 to bring the clutch 3 into the engagement state through the half-engagement state. When the shift operation is completed with the clutch 3 brought into the engagement state, the controller 9 performs the fuel injection control operation and the ignition control operation so as to provide the engine output according to the throttle opening degree.

In a preferred embodiment of the present invention, the vehicle automatic transmission device includes the clutch 3, the transmission 8, the clutch actuator 11, the shift actuator 13, the controller 9, and the like.

When the vehicle speed is reduced to below a downshift threshold predetermined for each of the gear positions with the clutch 3 assuming the engagement state, the controller 9 may perform an automatic downshift control operation. More specifically, when the vehicle speed is reduced to below a clutch disengagement threshold predetermined for each of the shift stages, the controller 9 controls the clutch actuator 11 to bring the clutch 3 into the disengagement state. When the vehicle speed is reduced to below the downshift threshold, the controller 9 controls the shift actuator 13 to change the gear position so as to shift down the shift stage by one. If the vehicle speed is further reduced to below a downshift threshold for the shift stage after the downshift, the controller 9 changes the gear position so as to further shift down the shift stage by one. Thereafter, the controller 9 controls the clutch actuator 11 to bring the clutch 3 into the engagement state through the half-engagement state. When the shift operation is completed with the clutch 3 brought into the engagement state, the controller 9 performs the fuel injection control operation and the ignition control operation so as to provide the engine output corresponding to the throttle opening degree.

When the shift stage is the lowest shift stage and the vehicle speed is reduced to below the clutch disengagement threshold corresponding to the lowest shift stage, the controller 9 disengages the clutch 3. More specifically, when the lowest forward drive gear position is selected from the plurality of forward drive gear positions and the vehicle speed is reduced to below the clutch disengagement threshold, the clutch 3 is disengaged.

A vehicle speed sensor 17 may be provided to detect the vehicle speed. An output signal of the vehicle speed sensor 17 is inputted to the controller 9. The vehicle speed sensor 17 may detect the rotation speed of the drive shaft 85, or may detect the rotation speed of a rotation shaft present further downstream of the drive shaft 85. Rather than providing the vehicle speed sensor 17, the main shaft sensor 16 may be used as the vehicle speed sensor.

Figure 2:
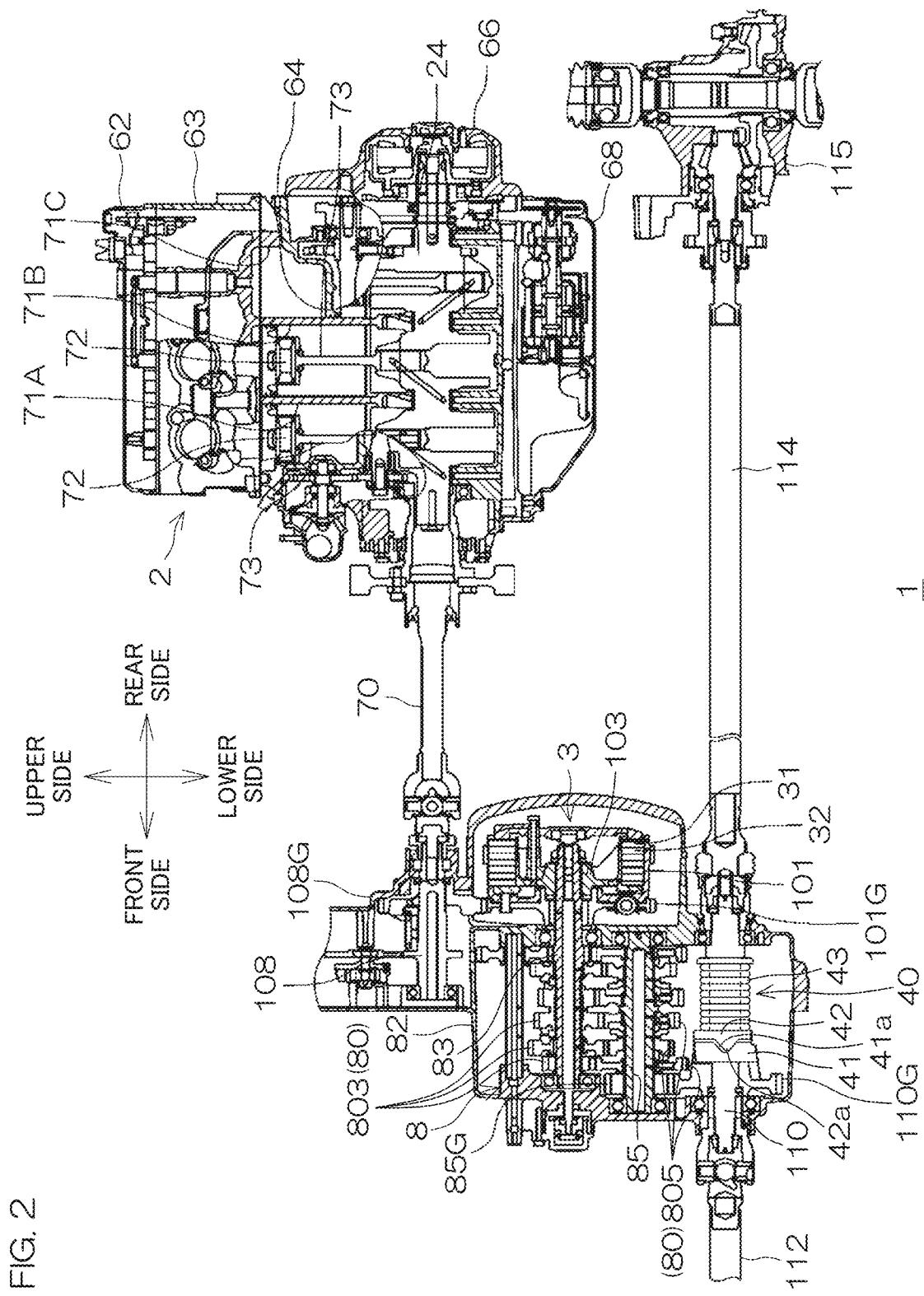
FIG. 2 is a sectional view showing the construction of an engine and a transmission provided in the vehicle by way of specific example.

FIG. 2 is a sectional view showing the construction of the engine 2 and the transmission 8 by way of specific example. The engine 2 includes a crank case 66, a cylinder body 64, a cylinder head 63, and a cylinder head cover 62. An oil pan 68 which recovers oil circulated within the engine 2 is located below the crank case 66.

The crank shaft 24 of the engine 2 extends anteroposteriorly of the vehicle. The crank shaft 24 is located in the crank case 66. A coupling shaft 70 is connected to a front end of the crank shaft 24.

Cylinders 71A, 71B, 71C are provided in the cylinder body 64. Pistons 72 are respectively accommodated in the cylinders 71A, 71B, 71C. The pistons 72 are connected to the crank shaft 24 via control rods 73. In this example, the engine 2 is a three-cylinder engine including the three cylinders 71A to 71C. Alternatively, the engine 2 may be a single-cylinder engine including a single cylinder, or may be a multi-cylinder engine including two cylinders, or four or more cylinders.

The coupling shaft 70 is coupled to an input shaft 108. The input shaft 108 extends anteroposteriorly of the vehicle. The input shaft 108 receives the driving force of the crank shaft 24 via the coupling shaft 70 to be thus rotated. The input shaft 108 may be coupled directly to the crank shaft 24 without the provision of the coupling shaft 70. A gear 108G is provided around the input shaft 108. The rotation of the input shaft 108 is transmitted to the clutch 3 via the gear 108G.

In the present preferred embodiment, the clutch 3 is a wet multi-plate frictional clutch. A torque generated by the crank shaft 24 is transmitted to the clutch 3 via the input shaft 108. The clutch 3 is able to intermittently transmit the torque generated by the crank shaft 24. The clutch 3 is provided at one end (a rear end in the present preferred embodiment) of the main shaft 83 of the transmission 8. The clutch 3 includes a clutch housing 101, a clutch boss 103, the driving plates 31, and the driven plates 32. The driving plates 31 are provided inward of the clutch housing 101. The driving plates 31 are rotated together with the clutch housing 101. The torque of the crank shaft 24 is transmitted to the driving plates 31 via the input shaft 108. The driven plates 32 are provided outward of the clutch boss 103. The driven plates 32 are rotated together with the clutch boss 103. The driving plates 31 and the driven plates 32 are alternately located anteroposteriorly of the vehicle. A gear 101G is provided around the clutch housing 101. The gear 101G meshes with the gear 108G provided around the input shaft 108. Therefore, the clutch housing 101 is coupled to the input shaft 108. The clutch 3 may be a single-plate frictional clutch, or may be a dry frictional clutch.

The transmission 8 includes a transmission case 82, the main shaft 83, the drive shaft 85, and the plurality of transmission gears 80.

The main shaft 83 is accommodated in the transmission case 82. The main shaft 83 is parallel or substantially parallel to the input shaft 108. The main shaft 83 is fixed to the clutch boss 103. The main shaft 83 is rotated together with the clutch boss 103. Therefore, the main shaft 83 receives the driving force of the crank shaft 24 to be rotated. The transmission gears 80 include a plurality of main shaft gears 803 provided around the main shaft 83.

The drive shaft 85 is accommodated in the transmission case 82. The drive shaft 85 is parallel or substantially parallel to the main shaft 83. The transmission gears 80 include a plurality of drive shaft gears 805 provided around the drive shaft 85. A gear 85G is provided at one end (a front end in the present preferred embodiment) of the drive shaft 85.

An output shaft 110 extending anteroposteriorly of the vehicle is located below the transmission 8. A gear 110G is provided around the output shaft 110. The gear 110G meshes with the gear 85G provided around the drive shaft 85. Therefore, the output shaft 110 is coupled to the drive shaft 85. The output shaft 110 receives the driving force of the drive shaft 85 to be rotated. A front propeller shaft 112 is coupled to a front end of the output shaft 110. The front propeller shaft 112 extends anteroposteriorly of the vehicle. The front propeller shaft 112 receives the driving force of the output shaft 110 to be thereby rotated. The front propeller shaft 112 is coupled to right and left front wheels (front driving wheels 5, see FIG. 1) via a front differential (not shown). A rear propeller shaft 114 is coupled to a rear end of the output shaft 110. The rear propeller shaft 114 extends anteroposteriorly of the vehicle. The rear propeller shaft 114 receives the driving force of the output shaft 110 to be rotated. The rear propeller shaft 114 is coupled to right and left rear wheels (rear driving wheels 5, see FIG. 1) via a final gear 115. In the present preferred embodiment, the vehicle 1 is a four-wheel drive vehicle, but not limited thereto.

The output shaft 110 is provided with a clutch damper 40 to reduce a shock occurring in the torque transmission. The clutch damper 40 is provided between the gear 110G and the output shaft 110 to transmit the torque between the gear 110G and the output shaft 110. Specifically, the clutch damper 40 includes a first member 41 to be rotated about the output shaft 110 together with the gear 110G, a second member 42 splined to the output shaft 110 to be rotated together with the output shaft 110, and a compression coil spring 43 wound around the output shaft 110. A projection 42a provided on the second member 42 is engaged with a recess 41a provided in the first member 41, and the coil spring 43 biases the second member 42 toward the first member 41 so as to maintain the engagement between the projection 42a and the recess 41a. When the torque is inputted to the gear 110G to rotate the first member 41, the projection 42a is moved up on a tilt surface of the recess 41a, and the rotation of the first member 41 is transmitted to the second member 42 by a frictional force occurring between the recess 41a and the projection 42a.

The clutch damper 40 is one element of the elastic torsion element 4 (see FIG. 1) provided in the torque transmission system 6a extending from the clutch 3 to the driving wheels 5. In the present preferred embodiment, however, the elastic torsion element 4 includes elastic torsion components of all the rigid bodies (elastic members) involved in the torque transmission in the torque transmission system 6*a*. More specifically, the elastic torsion element 4 includes not only the torsion component of the clutch damper 40, but also the torsion components of the drive shaft 85, the output shaft 110, the propeller shafts 112, 114, and the like, and also includes the torsion components of elastic elements (including tires) of the driving wheels 5.

Figure 3:
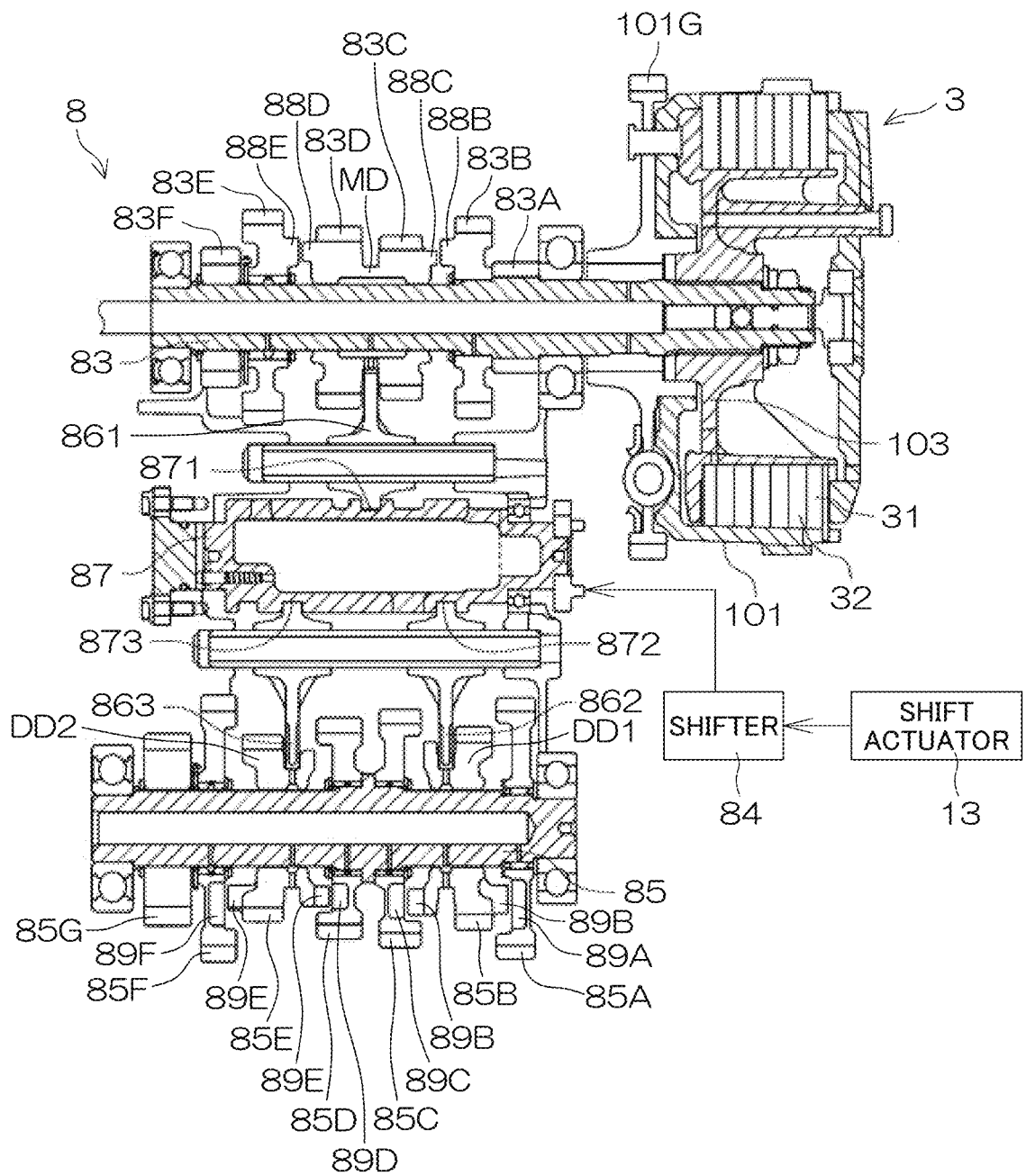
FIG. 3 is a sectional view for describing the construction of the transmission in detail.

FIG. 3 is a sectional view for describing the construction of the transmission 8 in detail. In FIG. 3, the construction of the transmission 8 is shown in expanded section so that the shift cam 87, which does not appear in the sectional view of FIG. 2, is located between the main shaft 83 and the drive shaft 85.

The main shaft gears 803 (see FIG. 2) include main shaft gears 83A to 83F. The main shaft gears 83A, 83B, 83E, 83F are stationary gears which are not movable axially of the main shaft 83. The main shaft gears 83C, 83D are movable gears which are movable axially of the main shaft 83. The main shaft gears 83A to 83F are rotated together with the main shaft 83. The main shaft gears 83B, 83E are relatively moved with respect to the main shaft 83 depending on a meshing state.

The drive shaft gears 805 (see FIG. 2) include drive shaft gears 85A to 85F. The drive shaft gears 85A to 85F respectively mesh with the main shaft gears 83A to 83F. The drive shaft gears 85A, 85C, 85D, 85F are stationary gears which are not movable axially of the drive shaft 85. The drive shaft gears 85B, 85E are movable gears which are movable axially of the drive shaft 85. The drive shaft gears 85A to 85F are rotated together with the drive shaft 85. The drive shaft gears 85A, 85C, 85D, 85F are relatively moved with respect to the drive shaft 85 depending on a meshing state.

The transmission 8 includes the shift cam 87 of a drum shape, and shift forks 861, 862, 863. The shift cam 87 is provided with a plurality of grooves 871, 872, 873 each having an axial position variable according to the rotational angle of the shift cam 87. The shift forks 861, 862, 863 are respectively engaged with the grooves 871, 872, 873. The shift fork 861 is engaged with a main shaft movement dog MD unitary with the main shaft gears 83C, 83D. The shift forks 862, 863 are respectively engaged with a drive shaft movement dog DD1 unitary with the drive shaft gear 85B and a drive shaft movement dog DD2 unitary with the drive shaft gear 85E. The drive shaft movement dog DD1 is splined to the main shaft 83. The drive shaft movement dogs DD1, DD2 are splined to the drive shaft 85.

A dog 88B is provided on a surface of the main shaft gear 83B in opposed relation to the main shaft gear 83C. A dog 88C is provided on a surface of the main shaft gear 83C in opposed relation to the main shaft gear 83B. A dog 88D is provided on a side surface of the main shaft gear 83D in opposed relation to the main shaft gear 83E. A dog 88E is provided on a side surface of the main shaft gear 83E in opposed relation to the main shaft gear 83D. The main shaft movement dog MD is slid on the main shaft 83, such that the dogs 88B, 88C provided in a pair are brought into and out of engagement with each other and the dogs 88D, 88E provided in a pair are brought into and out of engagement with each other.

The drive shaft movement dog DD1 includes a pair of dogs 89B provided in opposed relation to the drive shaft gears 85A, 85C, respectively, on opposite sides of the drive shaft gear 85B. A dog 89A is provided on a side surface of the drive shaft gear 85A in opposed relation to the drive shaft gear 85B. A dog 89C is provided on a side surface of the drive shaft gear 85C in opposed relation to the drive shaft gear 85B. The drive shaft movement dog DD1 is slid on the drive shaft 85, such that the dogs 89A, 89B provided in a pair are brought into and out of engagement with each other and the dogs 89B, 89C provided in a pair are brought into and out of engagement with each other.

The drive shaft movement dog DD2 includes a pair of dogs 89E provided in opposed relation of the drive shaft gears 85D, 85F, respectively, on opposite sides of the drive shaft gear 85E. A dog 89D is provided on a side surface of the drive shaft gear 85D in opposed relation to the drive shaft gear 85E. A dog 89F is provided on a side surface of the drive shaft gear 85F in opposed relation to the drive shaft gear 85E. The drive shaft movement dog DD2 is slid on the drive shaft 85, such that the dogs 89D, 89E provided in a pair are brought into and out of engagement with each other and the dogs 89E, 89F provided in a pair are brought into and out of engagement with each other.

The shift actuator 13 drives the shifter 84, which in turn rotates the shift cam 87. With the shift cam 87 being rotated, the shift forks 861, 862, 863 are moved axially of the shift cam 87. Then, the shift forks 861, 862, 863 move at least some of the main shaft gears 83C, 83D and the drive shaft gears 85B, 85E. Thus, the combination of any of the main shaft gears 803 and any of the drive shaft gears 805 to be meshed with each other via the dogs 88B, 88C, 88D, 88E; 89B, 89C, 89E, 89F is changed, thus changing the speed ratio.

Figure 4:
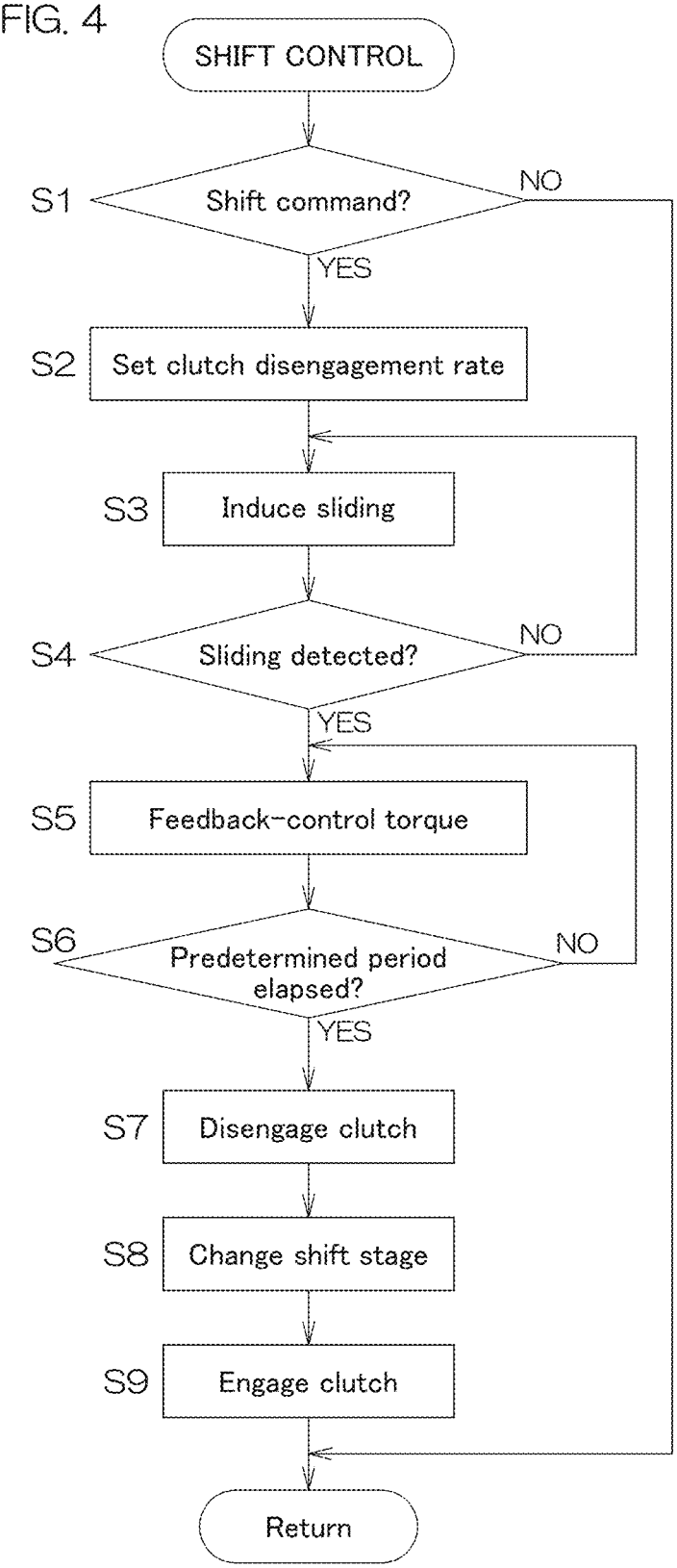
FIG. 4 is a flowchart for describing the function of a controller that controls a clutch and the transmission.

FIG. 4 is a flowchart for describing the function of the controller 9 to control the clutch 3 and the transmission 8, showing a shift control operation. The controller 9 is configured or programmed so as to function to perform the steps shown in FIG. 4. Specifically, as shown in FIG. 1, the controller 9 includes a CPU 98 (processor) and a memory 99. The CPU 98 executes a program stored in the memory 99 to function as the transmission controller to perform the steps of FIG. 4.

When the upshift switch 30U or the downshift switch 30D is operated, the controller 9 regards the input from the switch 30U, 30D as the shift command. When the automatic downshift operation is performed, the controller 9 issues a shift command therein with a certain condition satisfied. In response to the shift command, the controller 9 brings the clutch 3 into the sliding state, and feedback-controls the transmission torque of the clutch 3 to a target torque with the clutch 3 kept in the sliding state. The sliding state is herein defined as a state in which the torque is transmitted with the driving plates 31 and the driven plates 32 in sliding contact with each other, or a state in which the rotation speed of the driving plates 31 is virtually different from the rotation speed of the driven plates 32. The target torque is preferably predetermined in conformity with the design of the torque transmission system 6 including the transmission 8, the design of the vehicle 1, and the like by simulations or experiments. More specifically, the target torque is preferably determined so that the driving force loss feeling is reduced to an acceptable level during a shift operation period. Further, the target torque is preferably determined so that the amplitude of the rotation fluctuation of the elastic torsion element 4 is reduced to an acceptable level until the clutch 3 is brought into the disengagement state (see Steps S6 and S7 to be described later).

The shift control operation will be described more specifically with reference to FIG. 4. If the shift command is issued (YES in Step S1), the controller 9 performs a clutch disengagement rate setting step (Step S2). Specifically, the controller 9 sets a clutch disengagement rate based on the transmission torque of the clutch 3. More specifically, the controller 9 sets the clutch disengagement rate based on a difference between the latest transmission torque and the target torque. The latest transmission torque is a transmission torque observed before the setting of the clutch disengagement rate after the issue of the shift command, and a transmission torque observed immediately before a slide inducing step to be described next. A specific example of computation of the transmission torque will be described below.

The controller 9 performs the slide inducing step (Step S3) to induce the sliding state of the clutch 3. Specifically, the controller 9 generates the clutch command value, which is gradually changed so as to operate the clutch 3 in the disengaging direction at the clutch disengagement rate set at Step S2. The clutch disengagement rate may define the change rate of the clutch command value.

The controller 9 determines whether the clutch 3 assumes the sliding state (Step S4), while performing the slide inducing step (Step S3). The controller 9 determines the rotation speed (driving side speed) of the driving plates 31, for example, based on the engine rotation speed. Further, the controller 9 determines the rotation speed (driven side speed) of the driven plates 32 based on the main shaft rotation speed detected by the main shaft sensor 16. If a difference between the driving side speed and the driven side speed is equal to or greater than a predetermined threshold, the controller 9 determines that the clutch 3 assumes the sliding state.

If the sliding state of the clutch 3 is detected (YES in Step S4), the controller 9 performs a torque feedback control operation to feedback-control the transmission torque of the clutch 3 to the target torque (Step S5). Thus, the clutch 3 is kept in the sliding state so as to maintain the transmission torque at the target torque.

The controller 9 continues to perform the torque feedback control operation until a predetermined period of time (e.g., about 150 milliseconds) has elapsed after the issue of the shift command (NO in Step S6). After a lapse of the predetermined period from the issue of the shift command (YES in Step S6), the controller 9 ends the torque feedback control operation, and performs a disengaging step to disengage the clutch 3 (Step S7). That is, the controller 9 generates a clutch command value to move the driving plates 31 and the driven plates 32 away from each other to discontinue the torque transmission.

After the disengaging step (Step S7), the controller 9 performs a shift stage changing step (Step S8). Specifically, the controller 9 actuates the shift actuator 13 to cause the transmission 8 to perform the shift operation according to the shift command with the clutch 3 kept in the disengagement state.

Upon completion of the shift operation, the controller 9 performs a clutch engaging step (Step S9) to engage the clutch 3. That is, the controller 9 generates a clutch command value to bring the clutch 3 into the engagement state. Thus, the driving plates 31 and the driven plates 32 are brought into contact with each other again to start transmitting the torque between the driving plates 31 and the driven plates 32. More specifically, the clutch engaging step (Step S9) includes the step of controlling the clutch 3 in the half-engagement state to bring the driving plates 31 and the driven plates 32 into sliding contact with each other. The clutch engaging step further includes the step of controlling the clutch 3 in the engagement state with the driving plates 31 and the driven plates 32 in engagement with each other without sliding after the half-engagement state.

Thus, the shift stage of the transmission 8 is changed according to the shift command.

Figure 5:
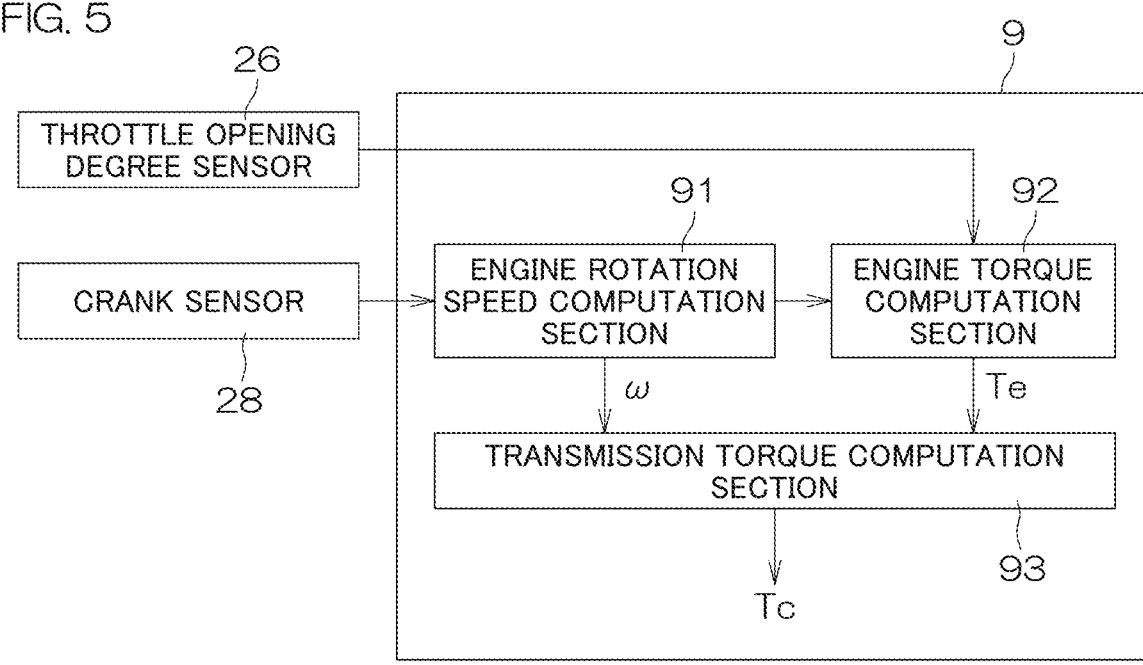
FIG. 5 is a control block diagram for describing the function of the controller to compute a transmission torque.

FIG. 5 is a control block diagram for describing the function of the controller 9 to compute the transmission torque. The controller 9 is configured or programmed to function as an engine rotation speed computation section 91, an engine torque computation section 92, and a transmission torque computation section 93. The engine rotation speed computation section 91 computes an engine rotation speed $\omega$ by using a pulse signal inputted from the crank sensor 28. The engine torque computation section 92 computes a torque (engine torque) Te generated by the engine 2 driven at the throttle opening degree detected by the throttle opening degree sensor 26 and the engine rotation speed computed by the engine rotation speed computation section 91.

The engine torque Te is determined based on engine torque characteristics related to the throttle opening degree and the engine rotation speed w. Specifically, a map indicating the engine torque characteristics related to the throttle opening degree and the engine rotation speed may be stored in the memory 99 (see FIG. 1). The engine torque computation section 92 determines the engine torque Te with reference to the map.

The transmission torque computation section 93 computes the transmission torque Tc based on the engine rotation speed $\omega$ computed by the engine rotation speed computation section 91 and the engine torque Te computed by the engine torque computation section 92.

Figure 6:
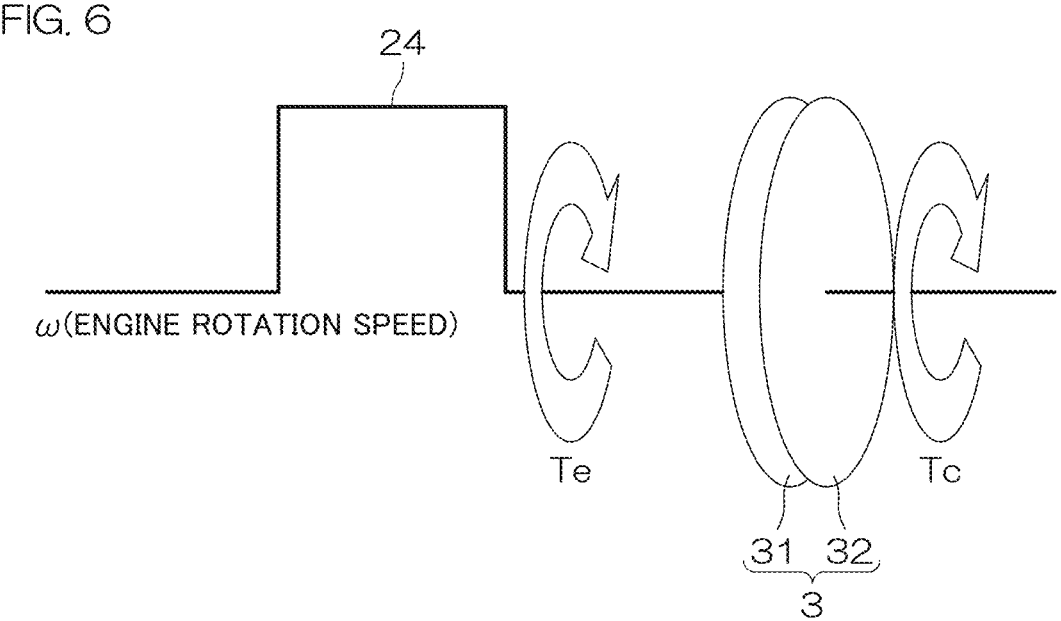
FIG. 6 is a diagram for describing the computation of the transmission torque by way of example.

FIG. 6 is a diagram for describing the computation of the transmission torque by way of example. The transmission torque Tc is a torque to be transmitted from the driving plates 31 to the driven plates 32 of the clutch 3. Where the rotational torque of the engine 2 is transmitted from the driving plates 31 to the driven plates 32, the transmission torque Tc has a positive value.

The engine torque Te supplied to the driving plates 31, the transmission torque Tc transmitted from the driving plates 31 to the driven plates 32, and the engine rotation speed co have a relationship represented by the following expression (1):

$$Te-Tc=I\times(d\omega/dt) \tag{1}$$

wherein I is a total inertial moment of the driving plates 31 of the clutch 3 and components upstream of the driving plates 31 (on the side of the engine 2) in the torque transmission system 6, and t is time.

It is apparent that the transmission torque Tc can be calculated from the following expression (2) obtained by transforming the expression (1):

$$Tc=Te-I\times(d\omega/dt) \tag{2}$$

That is, the transmission torque Tc can be computed based on the engine torque Te and the change d$\omega$/dt of the engine rotation speed $\omega$ with time. The computation is performed by the transmission torque computation section 93.

FIG. 7 is a schematic diagram for describing the shift operation to be performed in the transmission 8 by way of specific example, showing an exemplary operation to shift down the shift stage of the transmission 8 from an n-th shift stage to an (n−1)-th shift state. In the following description, reference will also be made to FIG. 3.

Where the shift stage of the transmission 8 is the n-th shift stage, the dog 88D of the main shaft movement dog MD is engaged with the dog 88E of the main shaft gear 83E, and the drive shaft movement dogs DD1, DD2 (not shown in FIG. 7, see FIG. 3) are not engaged with any of the drive shaft gears 80S. At this time, the rotation of the main shaft 83 is transmitted to the drive shaft 85 via the main shaft gear 83E and the drive shaft gear 85E.

The shift stage is shifted (shifted down) from the n-th shift stage to the (n−1)-th shift stage by moving the main shaft movement dog MD to engage the dog 88C with the dog 88B of the main shaft gear 83B. That is, when the shift stage is the (n−1)-th shift stage, the dog 88C of the main shaft movement dog MD is engaged with the dog 88B of the main shaft gear 83B, and the drive shaft movement dogs DD1, DD2 (not shown in FIG. 7, see FIG. 3) are not engaged with any of the drive shaft gears 80S. At this time, the rotation of the main shaft 83 is transmitted to the drive shaft 85 via the main shaft gear 83B and the drive shaft gear 85B.

Before the shift (when the shift stage is the n-th shift stage), the rotation speed (dog rotation speed) of the main shaft movement dog MD is equal to the rotation speed (main shaft rotation speed) of the main shaft 83. This is equal to the rotation speed (n-th shift stage dog rotation speed) of the dog 88E of the main shaft gear 83E engaged with the main shaft movement dog MD before the shift. Where the reduction ratio of the transmission 8 before the shift (when the shift stage is the n-th shift stage) is $Z_n$ and the reduction ratio of the transmission 8 after the shift (when the shift stage is the (n−1)-th shift stage) is $Z_{n-1}$, the rotation speed ((n−1)-th shift stage dog rotation speed) of the dog 88B of the main shaft gear 83B to be engaged with the main shaft movement dog MD after the shift is calculated from the following expression (3):

$$(n-1)\text{-th shift stage dog rotation speed} = n\text{-th shift stage dog rotation speed} \times Z_{n-1}/Z_n \quad (3)$$

FIGS. 8A to 8D are time charts for describing the shift operation according to the present preferred embodiment by way of specific example. In FIG. 8A, the clutch command value is shown by a line L1, and the actual clutch position is shown by a line L2. In FIG. 8B, the engine rotation speed is shown by a line L3, and the main shaft rotation speed is shown by a line L4. Further, the n-th shift stage dog rotation speed is shown by a line L5, and the (n−1)-th shift stage dog rotation speed is shown by a line L6. In FIG. 8C, a change in the rotational angle of the shift cam 87 detected by the gear position sensor 15 is shown by a line L7. In FIG. 8D, a change in the engine torque is shown by a line L8, and a change in the transmission torque of the clutch 3 is shown by a line L9.

In the present preferred embodiment, the clutch command value is a command value for the clutch position and, as described above, corresponds to a command value for the distances between the driving plates 31 and the driven plates 32. The actual clutch position is represented by the actual value of the clutch position, and corresponds to the actual distances between the driving plates 31 and the driven plates 32. Therefore, the clutch 3 is closer to the disengagement state, as the value of the clutch position increases. As indicated by the lines L1, L2, the actual clutch position is changed to follow the change in the clutch command value with a certain delay.

In FIG. 8B, the engine rotation speed, the n-th shift stage dog rotation speed, and the (n−1)-th shift stage dog rotation speed each have a value obtained by conversion to the rotation speed of the main shaft 83. Therefore, the n-th shift stage dog rotation speed (line L5) coincides with the main shaft rotation speed (line L4) before the shift, and the (n−1)-th shift stage dog rotation speed (line L6) coincides with the main shaft rotation speed (line L4) after the shift.

Where the torsion of the elastic torsion element 4 is kept unchanged in equilibrium with the clutch 3 in the engagement state, the transmission torque is equal to the engine torque. When the clutch 3 is in the sliding state (half-engagement state) or the disengagement state, the transmission torque is not equal to the engine torque. Further, where the torsion of the elastic torsion element 4 is fluctuated in non-equilibrium, the transmission torque is not equal to the engine torque.

When the vehicle 1 travels at the n-th shift stage, a shift command (downshift command) for the shift to the (n−1)-th shift stage is inputted at time t1. Then, the controller 9 instantly changes the clutch command value in the disengaging direction by a minute value predetermined so as not to bring the clutch 3 into the half-engagement state. Thereafter, as indicated by a reference character 201, the controller 9 changes the clutch command value at a clutch disengagement rate in the disengaging direction. The clutch disengagement rate is set based on the transmission torque observed at or around the issue of the shift command. On the other hand, the controller 9 performs the sliding state detection step.

If the sliding state is detected at time t2, the controller 9 performs the torque feedback control operation based on the transmission torque of the clutch 3. Specifically, the controller 9 controls the clutch command value so as to control the transmission torque to the target torque.

The controller 9 is kept on standby for a predetermined period ΔT (e.g., about 150 milliseconds) after the issue of the shift command, while performing the torque feedback control operation. At time t3 after a lapse of the predetermined period from the issue of the shift command, the controller 9 ends the torque feedback control operation, and changes the clutch command value to a value corresponding to the disengagement state.

Further, the controller 9 actuates the shift actuator 13 after a lapse of a predetermined shift standby period that is set not shorter than a period required for the actual clutch position to reach the clutch disengagement position. Thus, the shift cam rotation angle is changed from an n-th shift stage angle to an (n−1)-th shift stage angle after time t4, such that the main shaft movement dog MD is correspondingly slid on the main shaft 83. As a result, the main shaft movement dog MD is brought out of engagement with the main shaft gear 83E for the n-th shift stage into engagement with the main shaft gear 83B for the (n−1)-th shift stage. As indicated by a reference character 202, a state in which the n-th shift stage dog rotation speed (line L5) coincides with the main shaft rotation speed (line L4) is correspondingly changed to a state in which the (n−1)-th shift stage rotation speed (line L6) coincides with the main shaft rotation speed (line L4).

At time t5 after the completion of the movement of the main shaft movement dog MD, the controller 9 controls the clutch command value to a command value corresponding to the half-engagement state to bring the clutch 3 into the half-engagement state. At time t6 after the half-engagement state continues for a while, the controller 9 starts changing the clutch command value in the engaging direction. Thus, the clutch 3 is brought into the engagement state.

FIGS. 9A to 9D are time charts, which are similar to FIGS. 8A to 8D, for describing an exemplary shift operation according to a comparative example. In FIG. 9A, the clutch command value is shown by a line L11, and the actual clutch position is shown by a line L12. In FIG. 9B, the engine rotation speed is shown by a line L13, and the main shaft rotation speed is shown by a line L14. Further, the n-th shift stage dog rotation speed is shown by a line L15, and the (n−1)-th shift stage dog rotation speed is shown by a line L16. In FIG. 9C, a change in the rotational angle of the shift cam 87 is shown by a line L17. In FIG. 9D, a change in the engine torque is shown by a line L18, and a change in the transmission torque of the clutch 3 is shown by a line L19.

In the comparative example, the torque feedback control operation according to the above-described preferred embodiments is not performed, but the clutch command value is instantly increased to a value corresponding to the disengagement state in response to the shift command (time t11). Thus, the clutch 3 is instantly shifted from the engagement state to the disengagement state, such that the transmission torque is abruptly reduced as indicated by a reference character 211. Therefore, the torsion of the elastic torsion element 4 is instantly released downstream of the clutch 3. Thus, the torsion of the elastic torsion element 4 is vibrationally fluctuated. The amplitude of the vibrational fluctuation increases, as the engine torque at the disengagement of the clutch 3 becomes greater.

The torsional vibration of the elastic torsion element 4 causes the vibrational fluctuation of the rotation speeds of the main shaft 83 and the drive shaft 85. In this state, the main shaft movement dog MD (more specifically, the dog 88D) is disengaged from the dog 88E of the main shaft gear 83E for the n-th shift stage at time t12. At this time, the rotation of the drive shaft 85 is continuously transmitted to the main shaft gears 83E, 83B. Therefore, as shown by a reference character 212, the n-th shift stage rotation speed (line L15) and the (n−1)-th shift stage rotation speed (line L16) are continuously vibrationally fluctuated as corresponding to the torsional vibration of the elastic torsion element 4. On the other hand, the rotation of the drive shaft 85 is not transmitted to the main shaft 83, so that the main shaft rotation speed is stabilized as indicated by a reference character 213. Therefore, a difference between the main shaft rotation speed and the (n−1)-th shift stage rotation speed, i.e., a relative dog speed ΔV of the dog 88C of the main shaft movement dog MD with respect to the dog 88B of the main shaft gear 83B, is liable to be increased. When the dogs 88C and 88B are engaged with each other, these dogs collide with each other at the increased relative speed. The collision is liable to apply a greater load on the dogs 88C, 88B, and deteriorate the gear shift feeling.

In the present preferred embodiment, as shown in FIGS. 8A to 8D, the transmission torque is feedback-controlled to the target torque in the shift operation. The torque feedback control operation reduces the torsional vibration of the elastic torsion element 4. Thus, a difference between the main shaft rotation speed (line L4) and the (n−1)-th shift stage rotation speed (line L6), i.e., a relative dog speed ΔV, is not so great, even if the main shaft movement dog MD is disengaged from the dog of the main shaft gear 83E for the n-th shift stage at time t5. Therefore, when the main shaft movement dog MD (more specifically, the dog 88C) is engaged with the dog 88B of the main shaft gear 83B for the (n−1)-th shift stage, the dogs are prevented from colliding with each other at a higher relative dog speed. This prevents the application of a greater load to the dogs due to the collision, and the deterioration of the gear shift feeling.

In the vehicle 1 of the preferred embodiments of the present invention, as described above, the torque transmission system 6 has the elastic torsion element 4 located between the transmission 8 and the driving wheels 5 downstream of the clutch 3. In a preferred embodiment of the present invention, the elastic torsion element 4 includes the clutch damper 40. The clutch damper 40 reduces the shock occurring in the clutch engagement. On the other hand, the clutch damper 40, which serves as a major portion of the elastic torsion element 4, is liable to cause greater-amplitude torsional vibration.

According to a preferred embodiment of the present invention, the controller 9 functions as the transmission controller. Specifically, the controller 9 brings the clutch 3 into the sliding state in response to the issue of the shift command, and performs the torque feedback-controlling step (Step S5 in FIG. 4) to feedback-control the transmission torque to the target torque. Further, the controller 9 performs the disengaging step (Step S7 in FIG. 4) to disengage the clutch 3 after the torque feedback-controlling step. Thereafter, the controller 9 performs the shift stage changing step (Step S8 in FIG. 4) to change the shift stage of the transmission 8 according to the shift command, and then performs the engaging step (Step S9 in FIG. 4) to engage the clutch 3.

With this arrangement, the vibrational rotation fluctuation attributable to the elastic torsion element 4 including the clutch damper 40 is sufficiently reduced before the shift stage of the transmission 8 is changed. This reduces the shock occurring in the clutch engagement. In addition, when the shift stage of the transmission 8 is changed, it is possible to prevent the application of a greater load to the constituent components (particularly, the dogs) of the transmission 8, and to prevent the deterioration of the gear shift feeling.

The transmission torque of the clutch 3 significantly varies depending on the individual differences of the clutch 3 and the driving conditions of the vehicle 1. Therefore, it is difficult to maintain the transmission torque within a proper range even if the clutch command value is kept constant. This may make it impossible to effectively reduce the torsional vibration of the elastic torsion element 4. In a preferred embodiment of the present invention, therefore, the clutch command value is controlled to feedback-control the transmission torque to the target torque. This improves the robustness, and reliably and effectively reduces the torsional vibration of the elastic torsion element 4. In addition, the driving force loss feeling is reduced during the torque feedback control operation by properly setting the target torque.

If a control operation is performed to reduce the engine torque before the disengagement of the clutch 3, it may be possible to reduce the influence of the torsional vibration of the elastic torsion element 4. However, this control operation is not preferred particularly when the engine output is increased with the accelerator opening degree increased to provide a greater drive torque and, in this state, the downshift operation is performed. This is because the driver is liable to have an engine output reduction feeling even though stepping in the accelerator pedal. In a preferred embodiment of the present invention, the transmission torque is feedback-controlled in the disengagement of the clutch 3, making it possible to perform the shift operation, while maintaining the engine output. Further, it is possible to reduce the driving force loss feeling to an acceptable level, thus providing a comfortable gear shift feeling.

It is also conceivable to control the change rate of the clutch command value rather than feedback-controlling the transmission torque. However, as described above, the transmission torque of the clutch 3 is liable to vary due to various factors. Therefore, it is difficult to reliably reduce the torsional vibration of the elastic torsion element 4 even if the change rate of the clutch command value is controlled.

In response to the issue of the shift command, the controller 9 performs the slide inducing step (Step S3 in FIG. 4) to gradually reduce the engagement strength of the clutch 3 at a predetermined clutch disengagement rate until the sliding state of the clutch 3 is detected. Upon the detection of the sliding state of the clutch 3, the controller 9 starts performing the torque feedback-controlling step (Step S5 in FIG. 4). In the slide inducing step, the clutch 3 is quickly brought into the sliding state, so that the torque feedback control operation is quickly started by utilizing the sliding state. In addition, the sliding state is induced by gradually reducing the engagement strength of the clutch 3 at a predetermined clutch disengagement rate. Therefore, the clutch 3 is reliably brought into the sliding state. This prevents the torsion of the elastic torsion element 4 from being instantly released, thus further improving the gear shift feeling.

In a preferred embodiment of the present invention, the controller 9 sets the clutch disengagement rate based on the transmission torque observed immediately before the slide inducing step is started (more specifically, during the period from the issue of the shift command to the start of the slide inducing step). Thus, the clutch disengagement rate is properly set so as to reliably and quickly bring the clutch 3 into the sliding state. This makes it possible to quickly start the shift operation, while reducing the vibrational rotation fluctuation attributable to the elastic torsion element 4.

Where the transmission torque is great at the issue of the shift command, for example, it is appropriate to set the clutch disengagement rate at a relatively high level, because a comfortable gear shift feeling is provided by reducing a period from the start of the sliding state to the convergence of the transmission torque to the target torque. Where the transmission torque is small at the issue of the shift command, on the other hand, it is appropriate to set the clutch disengagement rate at a relatively low level. This is because the gear shift feeling tends to be deteriorated if the clutch disengagement rate is set at a relatively high level and the transmission torque is reduced to below the target torque.

If the clutch disengagement rate is excessively high, the transmission torque is excessively reduced before the start of the torque feedback control operation and, therefore, the driving force loss feeling observed before the recovery of the transmission torque is liable to be deteriorated to an unacceptable level. In addition, the excessive reduction of the transmission torque quickly releases the torsion of the elastic torsion element 4 and, therefore, the vibrational rotation fluctuation is liable to occur due to the quick release of the torsion. This may make it impossible to sufficiently reduce the shock in the shift operation. Therefore, as described above, it is preferred to set the clutch disengagement rate based on the difference between the transmission torque and the target torque.

The controller 9 performs the disengaging step (Steps S6 and S7 in FIG. 4) after a lapse of the predetermined period from the issue of the shift command. Thus, the torque feedback control operation makes it possible to provide a sufficient period of time to reduce the torsional vibration of the elastic torsion element 4 and to prevent the torque feedback-controlling step from being continuously performed for a prolonged period. This makes it possible to quickly achieve the shift operation, while reducing the load to the constituent components of the transmission 8 (particularly, the dogs) and preventing the deterioration of the gear shift feeling.

In a preferred embodiment of the present invention, the shift command to be issued to perform the torque feedback-controlling step includes the downshift command.

During the traveling of the vehicle 1, the downshift command may be issued in order to provide a higher torque. For example, the downshift may be required when the engine rotation speed is relatively high in rapid acceleration or uphill traveling. In this case, the transmission torque of the clutch 3 is high and, if the clutch 3 is suddenly disengaged, the torsion of the elastic torsion element 4 is instantly released. Accordingly, the internal rotation shaft of the transmission 8 is liable to suffer from a greater-amplitude rotation fluctuation. Therefore, a greater load is liable to be applied to the constituent components (particularly, the dogs) of the transmission 8, and a greater shock is liable to occur in the shift operation to deteriorate the gear shift feeling.

When the downshift command is issued, therefore, the rotation fluctuation of the rotation shaft is reduced by bringing the clutch 3 into the sliding state and feedback-controlling the transmission torque to the target torque. This reduces the load applied to the transmission constituent components (particularly, the dogs) in the downshift operation, and improves the gear shift feeling.

The shift command to be issued to perform the torque feedback-controlling step may be limited to the downshift command, or may not be limited to the downshift command. In a preferred embodiment described above, the shift command is not limited to the downshift command for performing the torque feedback-controlling step by way of example.

As described above, the vehicle 1 according to various preferred embodiments of the present invention is an irregular ground traveling vehicle, which is able to prevent the application of a greater load to the constituent components of the transmission 8 when the shift stage of the transmission 8 is changed, and the deterioration of the gear shift feeling.

While preferred embodiments of the present invention have thus been described, the present invention may be embodied in some other ways.

In the preferred embodiments described above, the method of setting the target torque and the method of setting the clutch disengagement rate are provided by way of example, but some other methods may be used as the setting methods.

In the preferred embodiments described above, the output of the main shaft sensor 16 is used to detect the sliding state of the clutch 3. Instead, the output of the vehicle speed sensor 17 may be used to determine the rotation speed of the driven plates 32.

In the preferred embodiments described above, the vehicle 1 including the clutch damper 40 has been described, but preferred embodiments of the present invention are applicable to a vehicle not including the clutch damper 40. In general, the rotation shafts of the torque transmission system extending from the clutch to the driving wheels are inevitably susceptible to the elastic torsional deformation and, therefore, the torque transmission system inevitably includes the elastic torsion element.

As described above, the present invention is applicable to any type of vehicle without limitation, and examples of the vehicles to which preferred embodiments of the present invention are applicable include irregular ground traveling vehicles and other four-wheel vehicles, and motorcycles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An automatic transmission device for a vehicle driven by transmitting a torque of an engine to driving wheels, the vehicle automatic transmission device comprising:
a clutch provided in a torque transmission system that extends from the engine to the driving wheels;
a transmission located between the clutch and the driving wheels in the torque transmission system; and
a transmission controller configured or programmed to:
perform a torque feedback-control to bring the clutch into a sliding state in response to issue of a shift command and feedback-control a transmission torque to a target torque;
disengage the clutch after the torque feedback-control;
change a shift stage of the transmission according to the shift command after disengaging the clutch; and
engage the clutch after changing the shift stage.

2. The vehicle automatic transmission device according to claim 1, wherein the transmission controller is configured or programmed to induce sliding in the clutch to gradually reduce an engagement strength of the clutch at a predetermined clutch disengagement rate in response to the issue of the shift command until a sliding state of the clutch is detected; and
upon the detection of the sliding state of the clutch, start the torque feedback-control.

3. The vehicle automatic transmission device according to claim 2, wherein the transmission controller is configured or programmed to set the clutch disengagement rate based on a transmission torque observed immediately before starting to induce sliding in the clutch.

4. The vehicle automatic transmission device according to claim 1, wherein the transmission controller is configured or programmed to disengage the clutch after a lapse of a predetermined period of time from the issue of the shift command.

5. The vehicle automatic transmission device according to claim 1, wherein the shift command includes a downshift command.

6. The vehicle automatic transmission device according to claim 1, wherein the torque transmission system includes an elastic torsion element located between the transmission and the driving wheels.

7. The vehicle automatic transmission device according to claim 6, wherein the elastic torsion element includes a clutch damper.

8. A vehicle comprising:
an engine;
driving wheels; and
the vehicle automatic transmission device according to claim 1.

* * * * *